July 29, 1969
L. T. VALENTINE
3,458,105
360° VACUUM SEAL CONTROL FOR INTERNAL
PIPELINE LINE-UP CLAMP
Filed Sept. 8, 1967
2 Sheets-Sheet 1
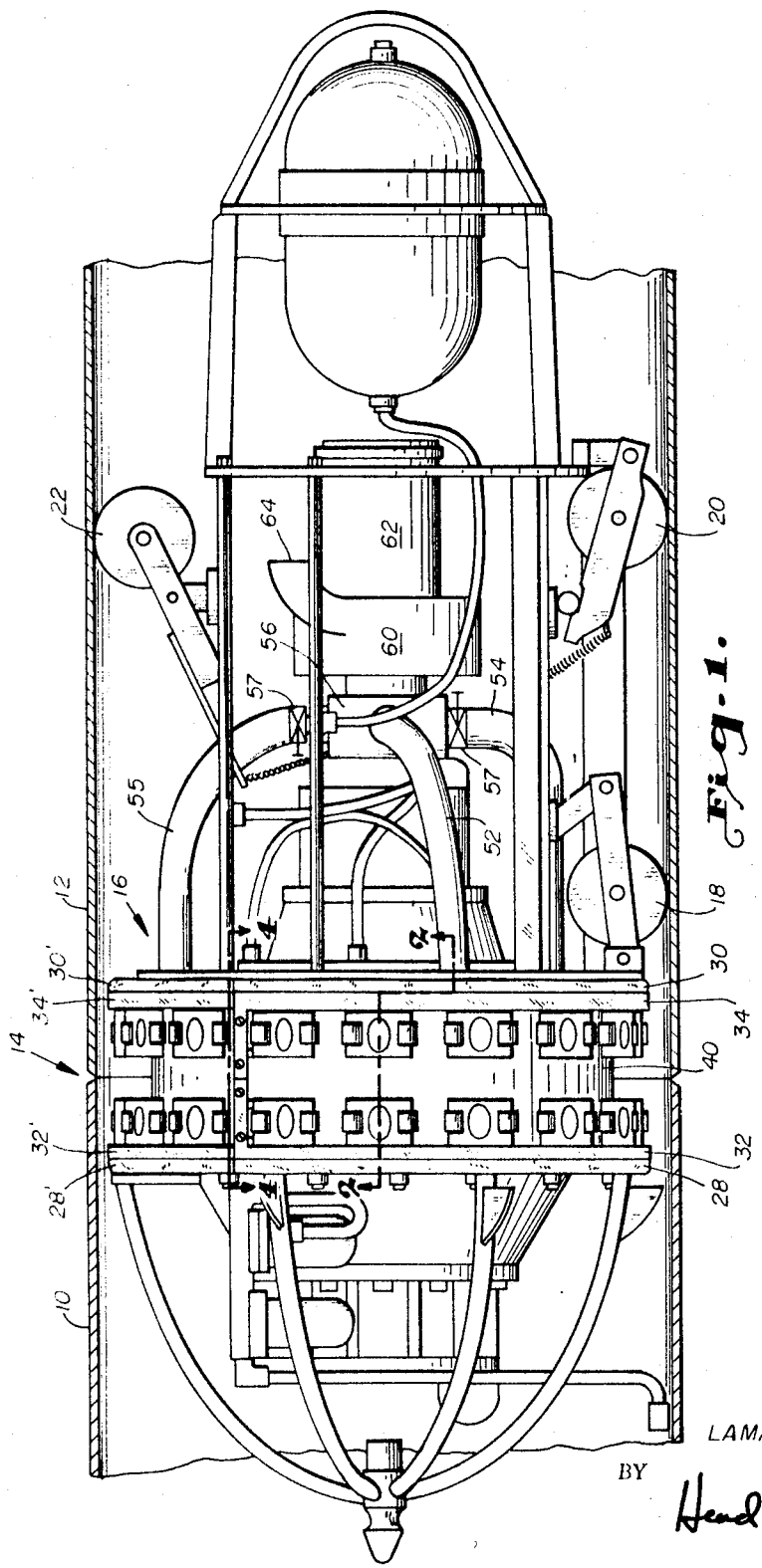
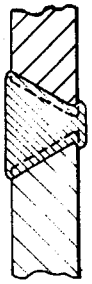
INVENTOR.
LAMAR T. VALENTINE
BY Head & Johnson
ATTORNEYS July 29, 1969 L. T. VALENTINE 3,458,105
360° VACUUM SEAL CONTROL FOR INTERNAL
PIPELINE LINE-UP CLAMP
Filed Sept. 8, 1967 2 Sheets-Sheet 2

INVENTOR.
LAMAR T. VALENTINE
BY Hand & Johnson
ATTORNEYS

United States Patent Office 3,458,105
Patented July 29, 1969

3,458,105
360° VACUUM SEAL CONTROL FOR INTERNAL PIPELINE LINE-UP CLAMP
Lamar T. Valentine, Tulsa, Okla., assignor of fifty percent to Joseph L. Parker, Tulsa, Okla.
Continuation-in-part of applications Ser. No. 650,274, June 30, 1967, and Ser. No. 666,432, Sept. 8, 1967.
This application Sept. 8, 1967, Ser. No. 666,336
Int. Cl. B23k *19/00, 5/22, 9/02*
U.S. Cl. 228—44       7 Claims

ABSTRACT OF THE DISCLOSURE

A 360° divided vacuum seal system is utilized in combination with an internal pipeline line-up clamp used in the welding of abutted elements, particularly lengths of pipe. A first resilient and expansible seal is adapted to be attached to and movable with the actuating plungers or dogs of the internal alignment clamp. The first seal space is adapted to extend slightly beyond the 180° lower portion of the pipe joint to be welded. A second vacuum seal space, separated from the first, extends the remaining circumferential distance of the line-up clamp. Each seal space is formed about the abutted pipe ends internally. A vacuum or withdrawal of air in the sealed space will override the gravity influence of the welding process.

CROSS-REFERENCES TO RELATED APPLICATIONS

This application is a continuation-in-part of Ser. No. 650,274, filed June 30, 1967, and Ser. No. 666,432, filed Sept. 8, 1967, entitled Vacuum Seal For Internal Pipeline Line-Up Clamp.

BACKGROUND OF THE INVENTION

In the welding of pipe utilized in a continuous length pipeline, the primary object is to achieve a weld which is at least equal to and preferably stronger than the pieces being welded. Rigid inspection is made of each joint after the welding process, by X-ray or known inspection processes to assure that this objective is achieved. Typically, in the welding of successive joints of pipeline, the process is usually done while the pipe is substantially horizontal, depending of course upon the terrain. The next succesive joint of pipe is aligned and abutted with the succeeding joint and the welding process begins.

As is explained in the above identified prior copending applications, during thermal welding of the upper portion of abutted lengths of pipe, the force of gravity tends to draw the molten weld metal towards the interior thereof. On the other hand, during the welding of the lower portion, gravity tends to cause the molten weld metal to flow towards the extremity of the pipe. Hence, in some situations, an accomplished welder can secure an adequate weld in the upper portion of the pipe having the desired strength and other characteristics. This becomes, however, extremely difficult and in some instances impossible to obtain an adequate weld in the lower portion of the pipe wherein the weld forms an interior bead within the interior of the pipe. That is, it has been found the desired configuration of a complete weld around the pipe includes a portion of molten weld metal extending at least to or slightly within the interior of the pipe around the full internal circumference. There are some situations where a satisfactory interior bead cannot be obtained even in the upper portion of the pipe, or it is desired to have an even larger interior bead than that accomplished in normal welding processes.

Accordingly, it is a primary object of this invention to provide a method and means for accomplishing a finished weld about abutted pipe ends having a satisfactory and quality weld configuration capable of passing destructive and nondestructive test standards.

Another important object of this invention is to provide a means for controlling the size and type of interior weld bead in the welding of pipe joints.

It is another object of this invention to provide a means for accomplishing a satisfactory weld configuration which is adaptable to be used in combination with an internal pipeline line-up clamp.

A still further object of this invention is to provide a vacuum seal system adapted to be independently expandable and contractable in conjunction with an internal pipeline line-up clamp and which provides separately sealed zones of controllable vacuum, or low pressure around the inner periphery of a pipeline joint to be welded.

BRIEF DESCRIPTION OF THE DRAWINGS

FIGURE 1 is an elevational view of the apparatus of this invention.

FIGURE 5 is a sectional view of two pipe elements representing a defective weld.

FIGURE 6 is a sectional view of two pipe elements representing a desired weld configuration accomplished by this invention.

DESCRIPTION OF THE PREFERRED EMBODIMENTS

Figure 2:
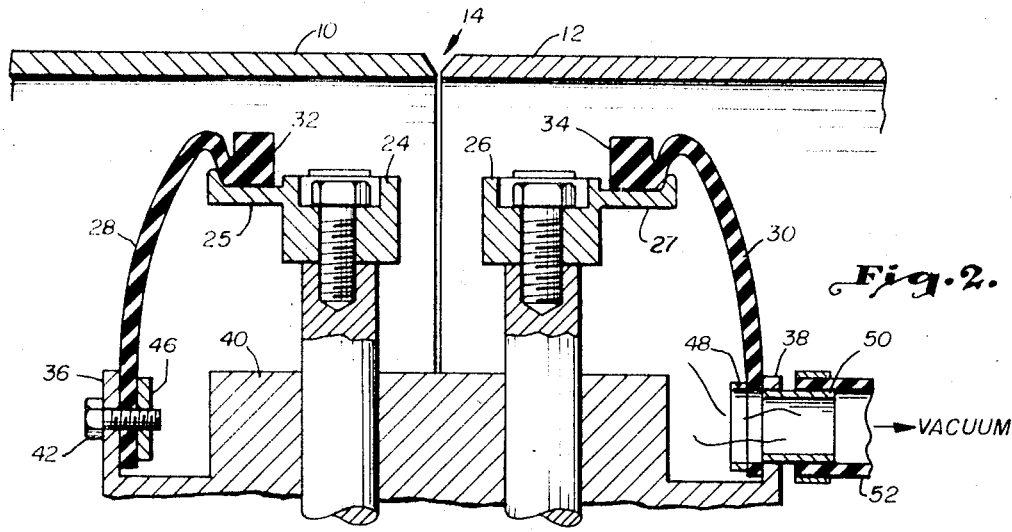
FIGURE 2 is a sectional view taken along the line 2—2 of FIGURE 1.

Referring now to FIGURE 1, pipe 10 is to be welded to pipe 12 at the single-V groove, generally indicated by the numeral 14 formed by beveling the ends of the pipe in a manner well known to those skilled in the art. To align the two pipe ends an internal pipeline line-up clamp, generally referred to by the numeral 16, is adapted to be inserted, centralized and supported for travel within the pipe on rollers 18, 20 and 22. The clamp is adapted to be pulled and/or pushed into the pipe section. The line-up clamp includes a first circumferential row of reciprocal plungers or dogs 24 substantially coaxial to said clamp axis and parallel spaced second row of circumferential dogs 26 likewise coaxial to said clamp axis. The plungers are adapted to be fluid actuated either hydraulically, but preferably pneumatically, to be reciprocated outwardly into engagement with the internal periphery of respectively pipes 10 and 12. That is, the circumferential row of dogs 24 are independently actuatable outward into engagement with pipe 10, whereas dogs 26 are likewise simultaneously and independently engageable with pipe 12 so as to straddle the joint forming the V-groove 14, within which the welding is to take place.

Independently associated with each row of dogs are resilient seal members more aptly described in FIGURE 2 which coact to form a first and lower seal space interiorly of the abutted pipe ends. Each seal includes respective resilient or expandable boots 28 and 30 and integral peripheral arcuate seal strips 32 and 34. The seal strips are arcuate members supported upon extensions 25 and 27 of the respective dogs 24 and 26 by the retracting force of the resilient strip which is stretched therabout. Each resilient and expandable boot 28 and 30 is sealably connected to outward flanges 36 and 38 which are formed as a part of the liner clamp body 40 being retained thereto by bolt 42 and inner-backup rings 46 and 48. A vacuum connection conduit 50 is positioned and attached to outward flange 38 and adapted to receive a supply conduit 52 clamped thereto. At least one vacuum supply connection is required, preferably three, which includes lines 52, 54 shown in FIGURE 1, and an identical line opposite conduit 52 on the other side, not seen in these views. These conduits interconnect to a central vacuum accumulation chamber 56 which is interconnected to the inlet of vacuum pump 60 driven by electric motor 62 or other well known power source, exhausting to the atmosphere through outlet 64. Each conduit can be controllable as by a valve. Typically the vacuum blower 60 is a centrifugal type or may be of the type described in copending application S.N. 666,432 filed Sept. 8, 1967, entitled Vacuum Supply System For Internal Pipeline Line-Up Clamp. In addition means are used, such as automatic pressure controls responsive to the low pressure or vacuum condition in the space as the welding progresses and closes the abutted pipe ends.

Figure 3:
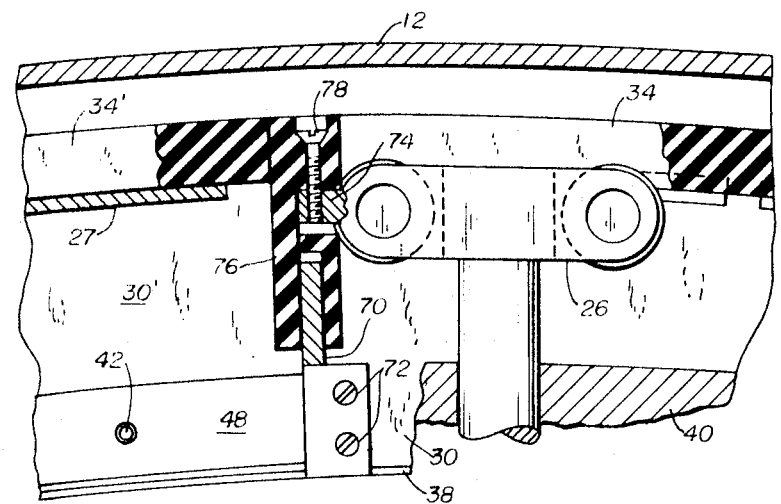
FIGURE 3 is a partial sectional view taken along the line 3—3 of FIGURE 4.
Figure 4:
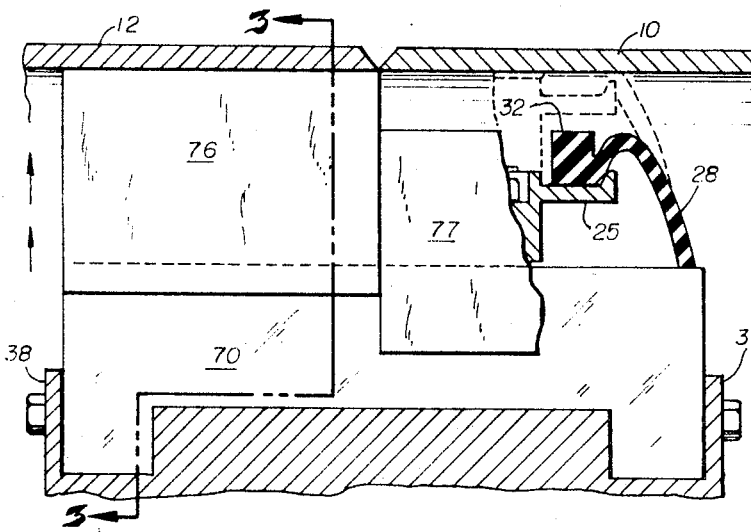
FIGURE 4 is a partial sectional view taken along the line 4—4 of FIGURE 1.

One transverse terminus of the first internal confined space formed by resilient boots 28 and 30 and respective rings 32 and 34 is depicted in the sectional views of FIGURES 3 and 4. Typically, the termini are positioned so as to confine said space to at least the lower 180° of the abutted pipe ends, preferably the lower 225°. The seal is accomplished by attaching a terminus plate 70 to outward flange 38 by bolts 72 which also is used to retain resilient boot 30. A lip extension 74 is formed as a part of dog 26, to which a resilient end seal member 76 is retained by bolts 78. Resilient end member 76 is an independent member attached to and movable with dog 26 as shown. A similar end member is attached to dog 24 and independently movable therewith, as is shown in FIGURE 4.

A second internal confined space, when the dogs are expanded, is formed in that internal arcuate portion above said termini of the first space by a continuation of the seal members previously described, and identified as shown in the drawings. At least one vacuum line connection 55 extends from accumulation chamber 56 and may be controllable as with a valve 57 or orifice connected in the conduit.

OPERATION

As shown in FIGURE 1, pipe 10 represents the ends to which pipe 12 is to be welded at the single V-groove 14. Pipe 12 is supported in substantially aligned position. In the event the welding process of the previous joint has been completed, pipeline line-up clamp 16 is pulled by means, not shown, to the position substantially shown in FIGURE 1 wherein the circumferential rows of dogs 24 and 26 are caused to be aligned straddling proposed joints to be welded. To cause exact alignment of the two sections of pipe, dogs 24 are expanded radially outward such as by pneumatic or hydraulic means supplied from an exterior source and not shown. Thereafter dogs 26 are expanded radially outward into engagement of the interior of pipe 12 and thus support the abutted joint in coaxial alignment. In the expanded position the seal strips 32 and 34, boots 28 and 30, and the termini create a first confined space about the lower section of pipe and preferably approximately the lower 225° of the pipe. Likewise companion seal strips 32′ and 34′, boots 28′ and 30′ and the same termini create a second confined space about the upper section of pipe. Vacuum motor 62 is started causing centrifugal pump 60 to withdraw air from the space through the abutted pipe joint interiorly as the welding process therearound begins. The low pressure air is withdrawn from the first space through conduits 52, 54 and a like conduit on the other side, not shown and through conduit 55 from the second upper space. When the welding process is completed, the dogs 24 and 26 are retracted and the process is repeated for the next section of pipe. As such, it is found that a weld within the single V-groove will result as that shown in FIGURE 6 instead of that shown in FIGURE 5 or other desired inner bead configuration as a function of the low pressure in each space.

The invention has been described with reference to specific and preferred embodiments. It will be apparent, however, that other modifications can be made without departing from the spirit and scope of the invention. For example, although a lower first and upper second space have been described as the preferred embodiment it is to be understood that more than two spaces may be constructed each with a controllable vacuum supply system. Accordingly, this invention should be construed not to be limited to the embodiment herein described but should be limited only by the scope of the appended claims.

What is claimed:
1. In an internal pipeline line-up clamp having parallel circumferential coaxial rows of outwardly expandable dogs alignable within said pipe to straddle abutted pipe ends for welding the improvement comprising in combination,
   seal means independently movable with each row of said dogs to engage with the inner periphery of said pipe and create a plurality of substantially confined spaces about the inner periphery of said abutted pipe ends when said dogs are radially expanded outward into said pipe; and
   means to withdraw air from each of said spaces.
2. A clamp according to claim 1 wherein said means to withdraw air from each of said spaces is controllable to each of said spaces.
3. A clamp according to claim 1 wherein there are two of said spaces.
4. A clamp according to claim 3 wherein the first of said spaces extends substantially around the lower 225° of said inner periphery and the second extends substantially around the remaining upper 135°.
5. A clamp according to claim 4 wherein said means to withdraw air from each of said first and second spaces is controllable as to the amount of vacuum or low pressure in each of said spaces.
6. A clamp according to claim 1 wherein said seal means includes
   a first arcuate expandable boot sealably attached coaxially to the body of said clamp adjacent one row of said dogs and having an integral coaxial seal strip ring section attached to said dogs;
   a second arcuate expandable boot sealably attached coaxially to the body of said clamp adjacent the other row of said dogs and having an integral coaxial seal strip ring section attached to said dogs; and
   transverse seal means forming the terminus of each of said confined spaces.
7. A clamp according to claim 1 wherein said means to withdraw air from said space includes a vacuum pump, inlet accumulation chamber and at least one conduit communicable between said chamber and each of said spaces.

References Cited
UNITED STATES PATENTS
3,387,761  6/1968  Pickard _____ 228—50

RICHARD H. EANES, Jr., Primary Examiner

U.S. Cl. X.R.
228—50